US 6,663,121 B2

(12) United States Patent
Santos et al.

(10) Patent No.: US 6,663,121 B2
(45) Date of Patent: Dec. 16, 2003

(54) INTERCONNECTED ROTARY SYSTEM WITH BUILT-IN SUSPENSION FOR BABY PRAMS

(75) Inventors: Emanuel Fernando Oliveira Santos, Caldas de Sao Jorge (PT); Valdemar Antunes Ferreira, Caldas de Sao Jorge (PT)

(73) Assignee: Bebecar - Utilidades para Crianca, LDA, Caldas de Sao Jorge (PT)

( * ) Notice: Subject to any disclaimer, the term of this patent is extended or adjusted under 35 U.S.C. 154(b) by 143 days.

(21) Appl. No.: 09/876,048

(22) Filed: Jun. 8, 2001

(65) Prior Publication Data

US 2002/0000701 A1 Jan. 3, 2002

(30) Foreign Application Priority Data

Jun. 30, 2000 (PT) .................................. 9 636

(51) Int. Cl.⁷ ................................................ B62B 7/04
(52) U.S. Cl. ...................... 280/47.38; 280/658; 280/642
(58) Field of Search ................................ 280/642, 647, 280/650, 657, 658, 47.38, 47.22, 47.25, 93.502, 93.51, 93.512

(56) References Cited

U.S. PATENT DOCUMENTS

| | | | | |
|---|---|---|---|---|
| 2,471,985 A | * | 5/1949 | Troendle | 280/47.11 |
| 2,589,679 A | * | 3/1952 | Dennesen | 280/47.11 |
| 2,669,460 A | * | 2/1954 | Wallner | 267/5 |
| 2,988,175 A | * | 6/1961 | West | 188/111 |
| 3,174,768 A | * | 3/1965 | Sanders et al. | 188/19 |
| 3,618,967 A | | 11/1971 | Sugiyama | |
| 3,856,254 A | | 12/1974 | Fattor | |
| 3,997,180 A | | 12/1976 | Okubo | |
| 4,543,685 A | * | 10/1985 | Kassai | 16/35 R |
| 4,570,288 A | * | 2/1986 | Kassai | 16/35 R |
| 4,637,093 A | | 1/1987 | Kassai | |
| 4,759,098 A | * | 7/1988 | Ko | 16/29 |
| 4,997,066 A | | 3/1991 | Bigo | |
| 5,125,676 A | * | 6/1992 | Teng | 16/35 R |
| 5,133,106 A | | 7/1992 | Milbredt et al. | |
| 5,509,172 A | * | 4/1996 | Lauro | 16/30 |
| 5,820,144 A | | 10/1998 | Wang | |
| 5,941,327 A | | 8/1999 | Wu | |
| 6,062,577 A | * | 5/2000 | Tan | 280/47.38 |
| 6,203,054 B1 | * | 3/2001 | Matsumoto | 280/47.38 |
| 6,302,421 B1 | * | 10/2001 | Lee | 280/210 |

FOREIGN PATENT DOCUMENTS

| | | |
|---|---|---|
| DE | 23 42 839 | 3/1975 |
| DE | 3506915 A1 | 8/1986 |
| DE | 88 10 568 | 10/1988 |
| DE | 198 26 101 A1 | 12/1999 |
| EP | 0 403 728 A2 | 12/1990 |
| EP | 0 865 782 A2 | 9/1998 |
| FR | 1 588 271 | 4/1970 |
| GB | 473 737 | 10/1937 |
| GB | 616 906 | 1/1949 |
| GB | 2 096 550 | 10/1982 |
| GB | 2 225 990 | 6/1990 |
| GB | 2 317 592 A | 4/1998 |
| WO | WO 99 19198 | 4/1999 |

* cited by examiner

Primary Examiner—Robert P. Olszewski
Assistant Examiner—James S. McClellan
(74) Attorney, Agent, or Firm—Young & Thompson

(57) ABSTRACT

An interconnected rotary system with built-in suspension is provided for baby prams, intended to provide a use of only two wheels with interconnected steering. This system consists of two rotary suspension blocks (2) supporting the wheels (1) fixed to the chassis on (X) with a suspension spring (5) inside the rotary block (2) and with the rotary points (Y) on which a steering bar (3) is articulated. This new system will allow the use of larger wheels, increasing both the baby and user's comfort.

7 Claims, 3 Drawing Sheets

INTERCONNECTED ROTARY SYSTEM WITH BUILT-IN SUSPENSION FOR BABY PRAMS

BACKGROUND OF THE INVENTION

The present Patent refers to an interconnected rotary system with built-in suspension for baby prams.

DESCRIPTION OF THE RELATED ART

Several rotary wheel systems with suspension are already known, with the normal use of four front wheels, two on each block to maintain balance and operating as a rotary wheel and completely independent.

Also, rotary systems exist with a single rotary type wheel, but also completely independent.

SUMMARY OF THE INVENTION

The present Patent provides the use of only two wheels with interconnected steering.

This new system will allow the use of larger size wheels, increasing the baby and user's comfort, since handling of the seat becomes easier.

The wheels are fixed to the front legs of the chassis and are fastened on blocks.

The blocks fit in the parts serving as the chassis bracing, said blocks being interconnected by a rod with two rotary points, making the two front wheels to become interlocked.

BRIEF DESCRIPTION OF THE DRAWINGS

The present Patent is illustrated by a set of drawings which make part of the present specification and which with illustrative and non-limiting character show a preferred embodiment, where.

DESCRIPTION OF THE PREFERRED EMBODIMENTS

Figure 1:
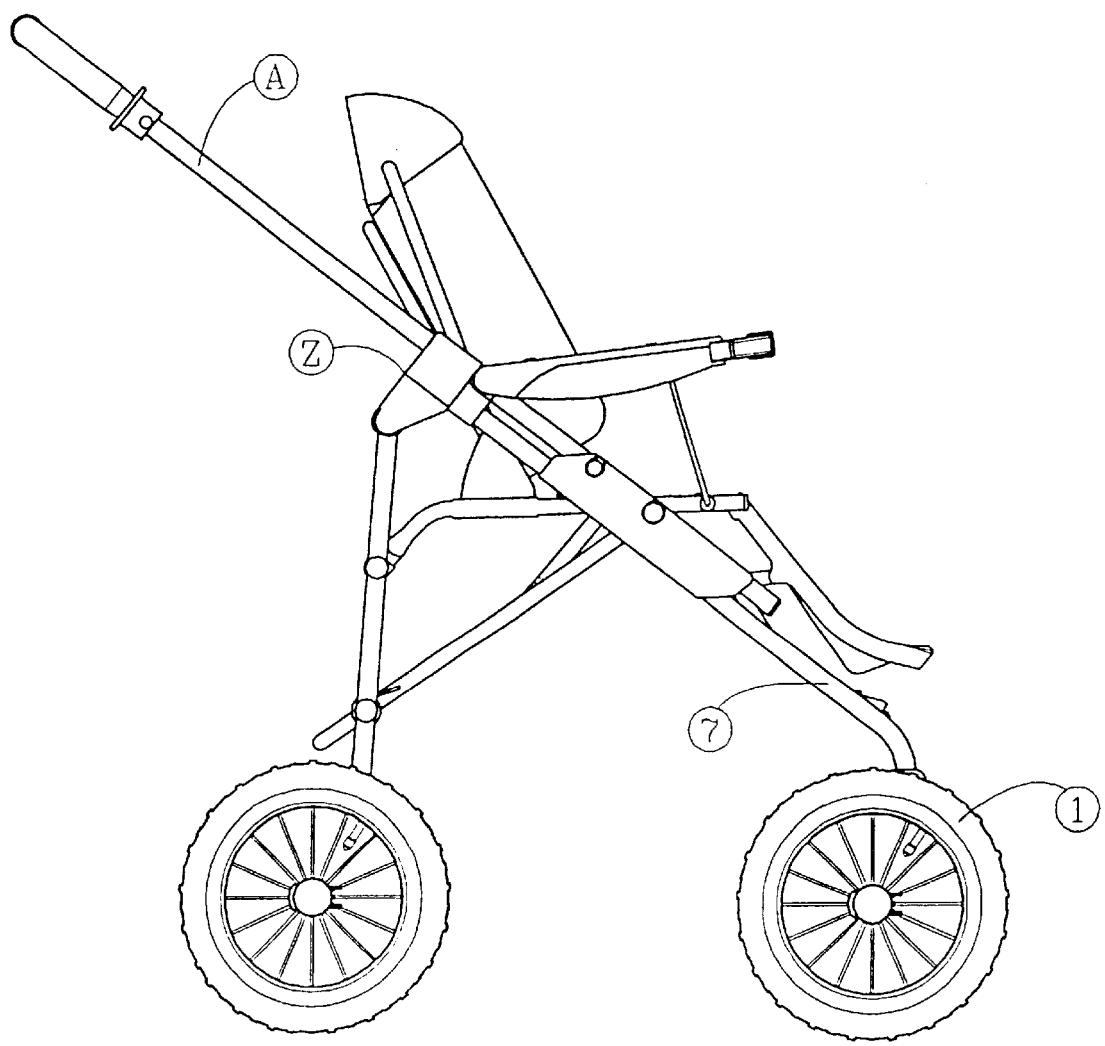
FIG. 1 shows a schematic side view of a baby's seat with the system according to the present Patent.

FIG. 1 shows a baby pram where (A) forms the pram handle, (Z) the support and articulation of the front and rear legs, (7) the front leg of the chassis and (1) a wheel of larger size than those used until now.

Figure 2:
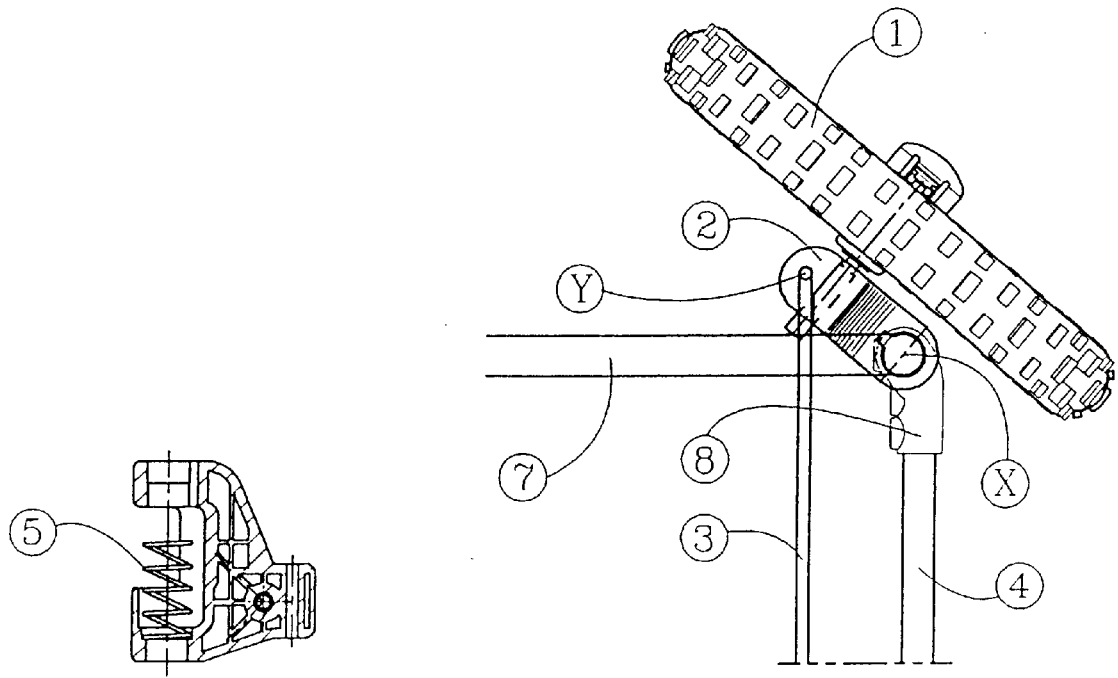
FIG. 2 shows a schematic detailed view of the rotary system according to the present Patent.

FIG. 2 schematically shows the interconnected rotary system according to the Patent, in which the front legs of the chassis (7) support on supports (X) the suspension blocks (2) of the wheels (1).

On supports (X) are also supported the connection parts (8) in which the bracing bar (4) of the chassis is fitted.

On the suspension blocks (2), there are the rotary points (Y), which serve as a support to the rod (3) providing the interlocking interconnection of the wheels (1).

Figure 3:
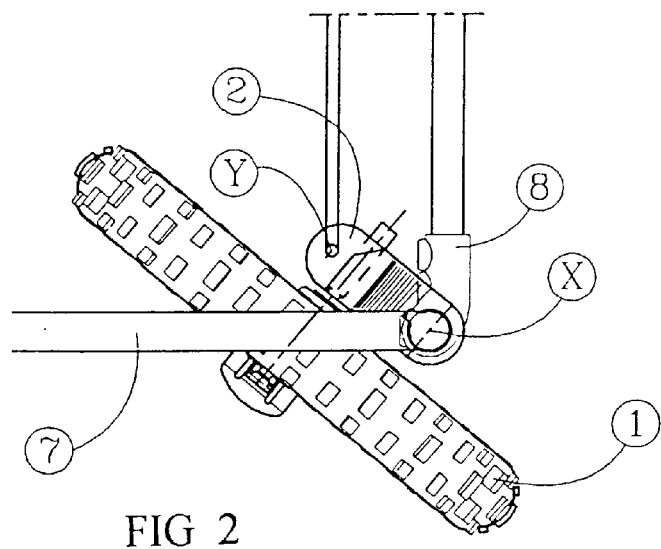
FIG. 3 shows a detailed view of a wheel support block.

FIG. 3 shows a section of a suspension block (2) with a suspension spring (5).

Figure 4:
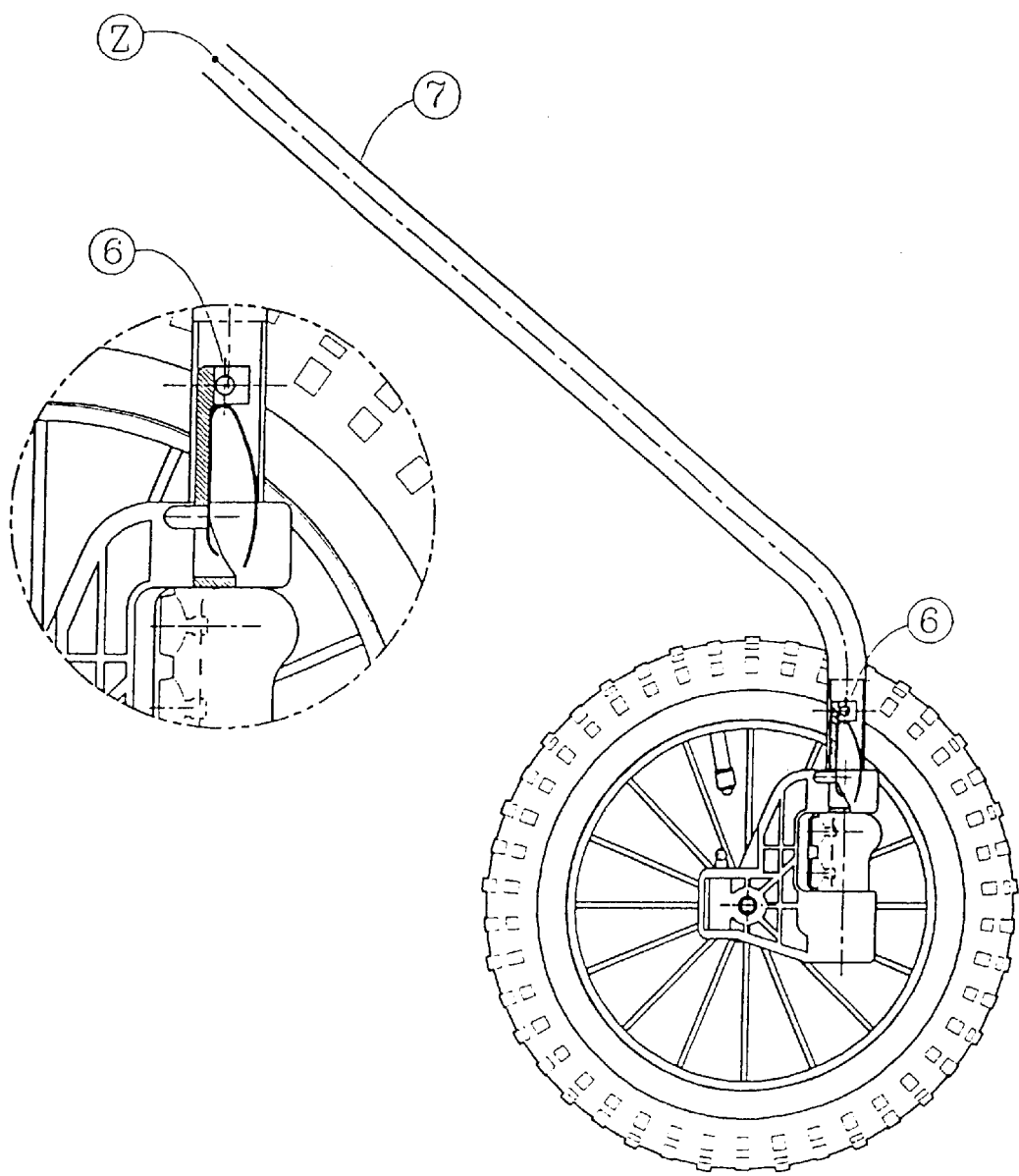
FIG. 4 shows a schematic view with details of the optional wheel blocking system.

FIG. 4 shows a section of the front leg of the chassis (7) inside of which a tie may operate in (Z) to make the wheel (1) to be blocked through the sliding device with a spring (6).

The operation of this blocking system may be carried out manually.

What is claimed is:

1. A steering and suspension system for front wheels of a baby pram having a chassis and front legs and front wheels, comprising:

a pair of suspension blocks for supporting lower ends of the front legs and for supporting the front wheels, the suspension blocks each having a rotary point;

an interconnection having ends attached to the rotary point of each of the suspension blocks and configured to interlockingly interconnect the suspension blocks together to provide that a steering of a first of the front wheels forces a parallel steering of a second of the front wheels;

a tie located inside one of the front legs; and a sliding spring device connected to the tie, the sliding spring device operating under direction of the tie to act on a rim of the first wheel stopping the first wheel and, via the interconnection rod, stopping the second wheel.

2. The system of claim 1, wherein the suspension blocks further comprise a suspension spring acting against an installed front leg.

3. The system of claim 1, wherein the interconnection is a rod pivotably attached to the rotary point of each of the suspension blocks.

4. The system of claim 3, further comprising a bracing bar having ends attached to each of the suspension blocks and being positioned in parallel with the rod.

5. A baby pram, comprising:

a pair of front wheels;

a pair of hollow front legs;

a pair of suspension blocks supporting lower ends of the front legs and supporting the front wheels, the suspension blocks each having a rotary point;

a interconnection rod having ends attached to the rotary point of each of the suspension blocks interlockingly interconnecting the suspension blocks together to provide that a steering of a first of the front wheels forces a parallel steering of a second of the front wheels;

a tie located inside one of the front legs; and a sliding spring device connected to the tie, the sliding spring device operating under direction of the tie to act on a rim of the first wheel stopping the first wheel and, via the interconnection rod, stopping the second wheel.

6. The pram of claim 5, wherein the suspension blocks further comprise a suspension spring acting against the supported lower end of front legs.

7. The pram of claim 5, further comprising a bracing bar having ends attached to each of the suspension blocks and being positioned in parallel with the rod.

* * * * *